(12) United States Patent
Kim et al.

(10) Patent No.: US 10,381,622 B2
(45) Date of Patent: Aug. 13, 2019

(54) BATTERY PACK

(71) Applicant: LG CHEM, LTD., Seoul (KR)

(72) Inventors: Tae-Wook Kim, Daejeon (KR);
Kwang-Il Kim, Daejeon (KR);
Jeong-Man Son, Daejeon (KR);
Jun-Hee Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 96 days.

(21) Appl. No.: 15/568,191

(22) PCT Filed: Oct. 12, 2016

(86) PCT No.: PCT/KR2016/011436
§ 371 (c)(1),
(2) Date: Oct. 20, 2017

(87) PCT Pub. No.: WO2017/065496
PCT Pub. Date: Apr. 20, 2017

(65) Prior Publication Data
US 2018/0108892 A1    Apr. 19, 2018

(30) Foreign Application Priority Data
Oct. 15, 2015 (KR) .......................... 10-2015-0144231

(51) Int. Cl.
*H01M 2/12*   (2006.01)
*H01M 2/10*   (2006.01)

(52) U.S. Cl.
CPC ....... *H01M 2/1258* (2013.01); *H01M 2/1077* (2013.01); *H01M 2/1252* (2013.01); *H01M 2200/00* (2013.01); *H01M 2220/20* (2013.01)

(58) Field of Classification Search
None
See application file for complete search history.

(56) References Cited

U.S. PATENT DOCUMENTS

| | | |
|---|---|---|
| 2010/0310918 A1 | 12/2010 | Yun et al. |
| 2011/0262791 A1 | 10/2011 | Im et al. |

(Continued)

FOREIGN PATENT DOCUMENTS

| | | | |
|---|---|---|---|
| EP | 1 744 383 A1 | 1/2007 | |
| EP | 1744383 A1 * | 1/2007 | ............. H01G 9/016 |

(Continued)

OTHER PUBLICATIONS

International Search Report (PCT/ISA/210) issued in PCT/KR2016/011436, dated Mar. 13, 2017.

(Continued)

*Primary Examiner* — Daniel S Gatewood
(74) *Attorney, Agent, or Firm* — Birch, Stewart, Kolasch & Birch, LLP (57) ABSTRACT

A battery pack which may secure safety when fire or gas occurs therein or when an external impact is applied thereto is provided. The battery pack includes: a cell assembly including a plurality of secondary batteries; and a pack case including a bottom part having a plate shape and located under the cell assembly, and a side wall part protruding from the bottom part to a preset height, the pack case accommodating the cell assembly in an inner space defined by the bottom part and the side wall part, wherein the side wall part of the pack case includes a hollow in a direction at least partially perpendicular to a thickness direction of the side wall part, and the hollow includes an inwardly open inlet and an outwardly open outlet.

12 Claims, 7 Drawing Sheets

(56) References Cited

U.S. PATENT DOCUMENTS

| | | | | |
|---|---|---|---|---|
| 2012/0288738 A1* | 11/2012 | Yasui | ............... | H01M 2/1022 |
| | | | | 429/82 |
| 2014/0205878 A1* | 7/2014 | Ohgitani | ............ | H01M 2/1072 |
| | | | | 429/82 |
| 2014/0363710 A1 | 12/2014 | Lee et al. | | |

FOREIGN PATENT DOCUMENTS

| | | |
|---|---|---|
| JP | 2010-272361 A | 12/2010 |
| JP | 2012-79510 A | 4/2012 |
| JP | 2014-139895 A | 7/2014 |
| JP | 2015-118811 A | 6/2015 |
| KR | 10-2008-0109950 A | 12/2008 |
| KR | 10-2009-0030545 A | 3/2009 |
| KR | 10-2013-0061895 A | 6/2013 |

OTHER PUBLICATIONS

The Written Opinion of the International Searching Authority (PCT/ISA/237) issued in PCT/KR2016/011436, dated Mar. 13, 2017 is submitted herewith.

\* cited by examiner

BATTERY PACK

TECHNICAL FIELD

The present disclosure relates to a battery including one or more secondary batteries, and more specifically, to a battery pack having improved safety and an automobile including the same.

The present application claims priority to Korean Patent Application No. 10-2015-0144231 filed on Oct. 15, 2015 in the Republic of Korea, the disclosure of which is incorporated herein by reference.

BACKGROUND ART

Currently, commercialized secondary batteries include nickel-cadmium batteries, nickel-hydrogen batteries, nickel-zinc batteries, lithium secondary batteries, etc. Among these batteries, lithium secondary batteries are in the limelight because the lithium secondary batteries have almost no memory effect compared with nickel-based secondary batteries and thus charging/discharging is freely performed, a self-discharge rate is very low, and energy density is high.

The lithium secondary battery primarily uses a lithium-based oxide and a carbon material as an anode active material and a cathode active material, respectively. The lithium secondary battery includes an electrode assembly in which an anode plate and a cathode plate coated with the anode active material and the cathode material, respectively, are arranged with a separator therebetween, and an exterior material sealing the electrode assembly and an electrolyte together.

Generally, lithium secondary batteries may be classified into can-type secondary batteries in which an electrode assembly is mounted within a metallic can, and pouch-type secondary batteries in which an electrode assembly is mounted within a pouch including an aluminum laminated sheet depending on the shape of an exterior material.

Recently, secondary batteries are widely used for medium and large apparatuses such as automobiles or power storing apparatuses as well as small apparatuses such as portable electronic apparatuses. In the case where the secondary batteries are used for medium and large apparatuses, lots of secondary batteries are electrically connected in order to increase capacity and power. Particularly, pouch-type secondary batteries are widely used for the medium and large apparatuses due to an advantage of easy stacking. Also, a plurality of secondary batteries may be stored in a pack case to configure one battery pack.

The battery pack requires various characteristics. Safety is a representative characteristic among the characteristics. Furthermore, since it is considered that safety of the battery pack mounted on an automobile is directly linked to life of a passenger, the safety of the battery pack is very important.

Particularly, one of important issues relating to the safety of the battery pack is direct exposure to a flame. In the case of the battery pack, although preventing fire from occurring in the inside of the battery pack is a first priority, fire may occur in the inside of the battery pack depending on cases. In this case, when a flame or a high temperature gas is exposed much to the outside of the battery pack, the exposed flame or high temperature gas may destroy or damage other elements in the vicinity of the battery pack and cause secondary fire. Particularly, when fire occurs in the inside of the mounted battery pack, the occurred fire may be very dangerous for a passenger. Furthermore, in the case where the battery pack is mounted on a hybrid automobile or collides with another automobile, when fire or a high temperature gas is exposed to a fuel storing tank, explosion of fuel may be caused and thus a big accident may be generated.

Also, another of important issues relating to the safety of the battery pack is impact resistance. That is, it is preferable that internal elements of the battery pack are not easily destroyed even by an impact of a preset level or more and maintain their performance. Particularly, since a battery pack for an automobile is always exposed to a danger of automobile collision, a characteristic that internal elements of the battery pack are not easily destroyed from an accident is required even more.

DISCLOSURE

Technical Problem

The present disclosure is designed to solve the problems of the related art, and therefore the present disclosure is directed to providing a battery pack which may secure safety when fire or gas occurs therein or an external impact is applied thereto, and an automobile including the battery pack.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack including: a cell assembly including a plurality of secondary batteries; and a pack case including a bottom part having a plate shape and located under the cell assembly, and a side wall part protruding from the bottom part to a preset height, the pack case accommodating the cell assembly in an inner space defined by the bottom part and the side wall part, wherein the side wall part of the pack case includes a hollow in a direction at least partially perpendicular to a thickness direction of the side wall part, and the hollow includes an inwardly open inlet and an outwardly open outlet.

The hollow may be provided long in a peripheral direction of the bottom part.

The hollow may be provided as two or more hollows in the side wall part.

The two or more hollows may be vertically arranged in the side wall part, a vertical through part may be provided between the two or more hollows, and the inlet and the outlet may be provided in different hollows, respectively.

In the pack case, the inlet and the outlet may be provided at an end part of one side of the two or more hollows, and the through part may be provided at an end part of another side of the two or more hollows.

The pack case includes two or more inlets and two or more outlets.

The side wall part may include a first side wall including the hollow and a second side wall not including the hollow.

The first side wall may be arranged in a peripheral direction of the bottom part with respect to the second side wall and opposite ends of the first side wall may be coupled to the second side wall.

The hollow may be provided vertically long.

The pack case may include a metallic material.

In another aspect of the present disclosure, there is also provided an automobile including the battery pack according to the present disclosure.

Advantageous Effects

According to the present disclosure, safety of a battery pack may be improved.

Particularly, in one aspect of the present disclosure, even when fire occurs in the inside of a battery pack, direct exposure of the fire or high temperature gas to the outside of the battery pack may be prevented or effectively reduced.

Therefore, according to this aspect of the present disclosure, loss of lives and property loss due to fire of a battery pack may be minimized and secondary fire or explosion, etc. may be prevented.

Furthermore, these effects of the present disclosure may be accomplished by a pack case, and a separate additional part or space, etc. for accomplishing these effects is not required or may be minimized.

Also, in another aspect of the present disclosure, even when an impact is applied from the outside of the battery pack, the pack case may relieve the impact.

Therefore, according to this aspect of the present disclosure, even when an automobile mounting the battery pack therein collides with another automobile or a building, destruction or damage of internal elements of the battery pack may be prevented or reduced. Therefore, in this case, even when a traffic accident occurs, an operation of the battery pack may be guaranteed, a reuse rate may be raised, and a danger such as ignition or explosion, etc. due to an accident may be reduced.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
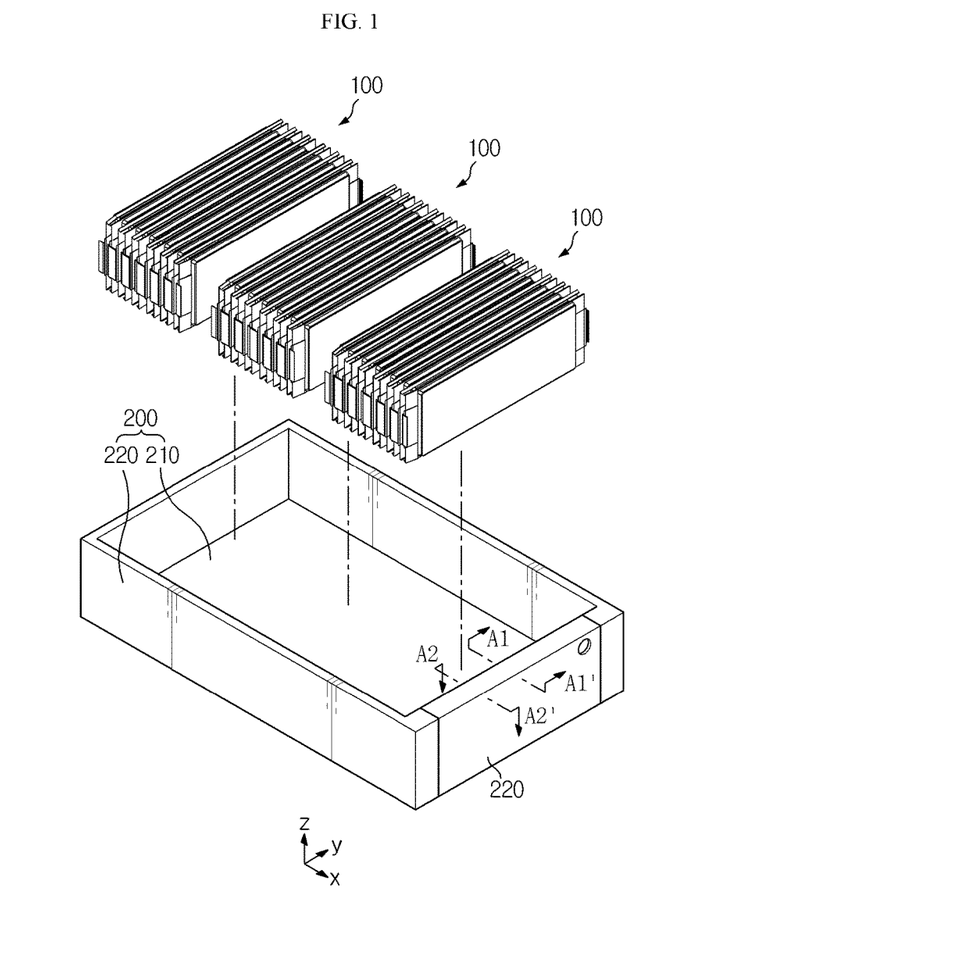
FIG. 1 is a perspective view schematically illustrating a configuration of a battery pack according to an embodiment of the present disclosure.

FIG. 1 is a perspective view schematically illustrating a configuration of a battery pack according to an embodiment of the present disclosure.

Referring to FIG. 1, the battery pack according to the present disclosure includes a cell assembly 100 and a pack case 200.

The cell assembly 100 may include a secondary battery. Here, the secondary battery may be a pouch-type secondary battery, but the present disclosure is not limited thereto.

The secondary battery may include an electrode assembly, an electrolyte, and an exterior material. Here, the electrode assembly is an assembly including an electrode and a separation layer and may be configured in a form in which one or more anode plates and one or more cathode plates are arranged with the separation layer therebetween. Also, an electrode tap may be provided to each electrode plate of the electrode assembly and connected to an electrode lead. Particularly, in the case of a pouch-type secondary battery, one or more electrode taps may be connected to the electrode lead, the electrode lead may be arranged between pouch exterior materials, one end thereof may be exposed to outside, and thus function as an electrode terminal. The exterior material may have an empty space therein to accommodate the electrode assembly and the electrolyte and may be provided in a sealed form. The exterior material may include a metallic material in the case of a can-type secondary battery, and in the case of a pouch-type secondary battery, may be configured in a form including an external insulating layer, a metallic layer, and an inner adhesive layer.

Since the configuration of the secondary battery is obvious to those skilled in the art to which the present disclosure pertains, more detailed description thereof is omitted. Also, the battery pack according to the present disclosure may employ various secondary batteries known at the time of filing of the present disclosure.

The cell assembly 100 may include a plurality of secondary batteries. For example, the cell assembly 100 may include a plurality of pouch-type secondary batteries. In this case, the pouch-type secondary batteries may be stacked in at least one direction. For example, a pouch-type secondary battery may be configured in a form in which the pouch-type secondary battery stands approximately vertically on the ground such that two wide surfaces thereof are located at left and right sides, a sealing part is located on upper and lower parts, and front and rear parts thereof. Also, the secondary battery standing as above may be arranged as a plurality of secondary batteries such that the plurality of secondary batteries are parallel horizontally in a form in which wide surfaces thereof face each other.

Also, a plurality of cell assemblies 100 may be provided to the battery pack. That is, one pack case 200 may include the plurality of cell assemblies 100 therein, and the plurality of cell assemblies 100 may be arranged horizontally and/or vertically. Also, the plurality of cell assemblies 100 may be mutually connected in series and/or in parallel through an assembly bus bar, etc.

The cell assembly 100 may further include various elements in addition to the secondary battery. For example, the cell assembly 100 may include a cartridge. The cartridge includes a polymer material and surrounds a periphery of a pouch-type secondary battery. Also, the cartridges may accommodate a pouch-type secondary battery in an inner space thereof and may be mutually stacked such that the plurality of pouch-type secondary batteries are arranged in parallel. Alternatively, the cell assembly 100 may further include a cell cover in addition to the secondary battery. The cell cover may include a metallic material such as aluminum and two cell covers are combinable as one unit and may accommodate one or more pouch-type secondary batteries in an inner space thereof while they are combined.

Also, the cell assembly 100 may further include an assembly case in addition to the secondary battery. The assembly case may be provided in a polyhedron shape such as a rectangular parallelepiped to accommodate one or more cell assemblies 100 in an inner space thereof. An assembly terminal may be provided to the outside of the assembly case and connected to another cell assembly 100, or electrically connected to an electrode terminal of the pack case 200.

The pack case 200 may include a bottom part 210 and a side wall part 220.

Here, the bottom part 210 may be provided in a plate form and located under the cell assembly 100 in parallel to the ground. For example, the bottom part 210 may be configured in an approximately quadrangular plate shape. Also, the cell assembly 100 may be seated on the bottom part 210.

The side wall part 220 may protrude to a preset height in an upward direction from the bottom part 210. Particularly, the side wall part 220 may be located along the bottom part 210, particularly, the periphery of the bottom part 210 to form one inner space in a horizontal direction. The cell assembly 100 may be accommodated in the inner space. For example, in the case where the bottom part 210 is provided in a quadrangular plate shape, the side wall part 220 may protrude to a preset height along the periphery of the bottom part 210 and so an upper surface thereof may have an approximately quadrangular ring shape when viewed in a direction from an upper part to a lower part. One or more cell assemblies 100 may be accommodated in a central part of the quadrangular ring.

Since the bottom part 210 may be configured in various shapes depending on a structure of an apparatus on which the battery pack is mounted, for example, an automobile, an upper surface of the side wall part 220 may also have various shapes depending on the shape of the bottom part 210. Also, the side wall part 220 is not necessarily located at the outermost portion of the bottom part 210, and at least a portion of the bottom part 210 may protrude outwardly further than the side wall part 220 in a horizontal direction.

The side wall part 220 may stand approximately vertically with respect to the bottom part 210. Also, the height of the side wall part 220 may change variously. For example, the side wall part 220 may have a height which is the same as or similar to the height of the cell assembly 100. Therefore, the side wall part 220 may cover at least a portion of a lateral surface of the cell assembly 100.

The pack case 200 may accommodate the cell assembly 100 in the inner space defined by the bottom part 210 and the side wall part 220. That is, the bottom part 210 may define a lower part of the pack case 200, and the side wall part 220 may define a lateral part of the pack case 200. Therefore, the lower surface of the cell assembly 100 may be covered by the bottom part 210, and the lateral surface of the cell assembly 100 may be covered by the side wall part 220.

Figure 2:
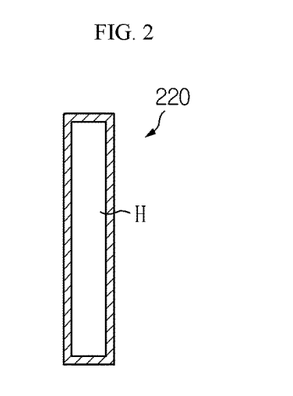
FIG. 2 is a cross-sectional view taken along a line A1-A1' of FIG. 1.
Figure 3:
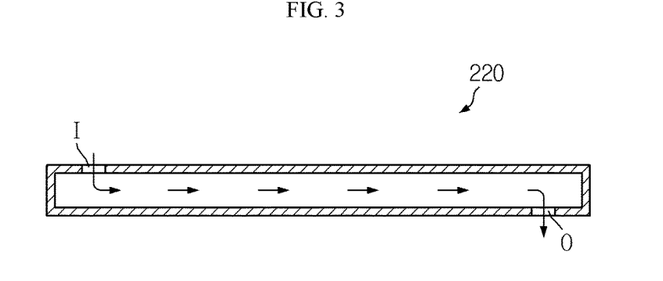
FIG. 3 is a cross-sectional view taken along a line A2-A2' of FIG. 1.

Particularly, in the pack case 200 of the battery pack according to the present disclosure, the side wall part 220 may at least partially include a hollow, which is described more specifically with reference to FIGS. 2 and 3.

FIG. 2 is a cross-sectional view taken along a line A1-A1' of FIG. 1, and FIG. 3 is a cross-sectional view taken along a line A2-A2' of FIG. 1.

Referring to FIGS. 2 and 3, like a part marked by H, an empty space, that is, a hollow may be provided in the inside of the side wall part 220 of the pack case 200. Also, the hollow H may be provided long in a direction perpendicular to a thickness direction of the side wall part 220. That is, a flow direction of fluid in the hollow H may be a direction perpendicular to the thickness direction of the side wall part 220. Here, the direction perpendicular to the thickness direction of the side wall part 220 may be a direction on a plane perpendicular to the thickness direction of the side wall part 220. For example, in the configuration of FIG. 1, in the case where the hollow H is provided to the left side wall part or the right side wall part, the hollow H is not provided such that a flow channel is provided in an x axis direction, which is the thickness direction of the side wall part 220, but is provided such that the flow channel is provided in one of directions on a y-z plane, which is a plane perpendicular to the thickness of the side wall part 220. Alternatively, in the configuration of FIG. 1, in the case where the hollow H is provided to the front side wall part or the rear side wall part, the hollow H may be provided such that a flow channel is provided in one of directions on an x-z plane, which is a plane perpendicular to the thickness of the side wall part 220. A part of the hollow H may be also provided in the thickness direction of the side wall part 220.

Also, an inlet and an outlet may be provided in the hollow H. That is, as marked by I and O in FIG. 3, the hollow H may be partially open inwardly and outwardly. Also, a hole which opens the hollow H inwardly may be referred to as the inlet, and a hole which opens the hollow H outwardly may be referred to as the outlet.

According to the configuration of the present disclosure, a gas discharge path including the inlet I, the hollow H, and the outlet O may be provided to the side wall part 220 of the pack case 200, and when a gas is generated from the inside of the battery pack, the gas may be swiftly discharged to the outside of the pack case 200. Therefore, explosion of the battery pack due to an increase in inner pressure of the pack case 200 by generation of the inner gas may be prevented.

Particularly, according to the configuration of the present disclosure, the length of the gas discharge path may be much longer than the thickness of the side wall part 220. That is, in the pack case 200 according to the present disclosure, the gas discharge path includes the inlet I, the hollow H, and the outlet O. The hollow H is not provide in the thickness direction of the side wall part 220 but may be provided in a lengthwise direction of the side wall part 220 like an arrow of FIG. 3, that is, a direction perpendicular to the thickness direction of the side wall part 220. Therefore, the length of the gas discharge path may be much longer than the thickness of the side wall part 220.

Therefore, even when fire occurs in the inside of the battery pack, flame may not be directly emitted to the outside of the battery pack. That is, the flame of the inside of the battery pack may be introduced to the hollow H to some extent, but the hollow H of the side wall part 220 may have a considerable length, so the flame may not reach to the outlet O of the side wall part 220. Therefore, according to this aspect of the present disclosure, when fire occurs in the inside of the battery pack, secondary fire, etc. due to outflow of flame to the outside may be effectively prevented.

Also, high temperature gas may be generated when fire occurs. According to the configuration of the present disclosure, leakage of the high temperature gas may be reduced. That is, temperature of the high temperature gas generated from the inside of the battery pack may be reduced while flowing through the hollow H of the side wall part 220, so leakage of the very high temperature gas to the outside may be minimized.

Furthermore, according to the configuration of the present disclosure, even when an impact is applied from the outside of the battery pack, the side wall part 220 may relieve the impact. That is, since the side wall part 220 includes the hollow H, when the impact is applied from the outside of the battery pack, the impact may be considerably absorbed by the hollow H of the side wall part 220. Therefore, destruction of elements inside the battery pack, for example, a secondary battery or various electric parts may be prevented by reducing transfer of the impact from the outside to the inside of the battery pack.

Preferably, the hollow H may be provided in the peripheral direction of the bottom part 210. Here, the peripheral direction of the bottom part 210 may be a horizontal direction among directions perpendicular to the thickness of the side wall part 220, that is, a direction parallel to the surface of the bottom part 210. For example, in the case of the left side wall part and the right side wall part in the configuration of FIG. 1, the peripheral direction may mean a y axis direction. Also, in the case of the front side wall part and the rear side wall part in the configuration of FIG. 1, the peripheral direction may mean an x axis direction.

Meanwhile, the configurations of the side wall parts 220 illustrated in FIGS. 2 and 3 are mere examples, and the present disclosure is not limited thereto and the side wall part 220 may be configured in various forms.

Figure 4:
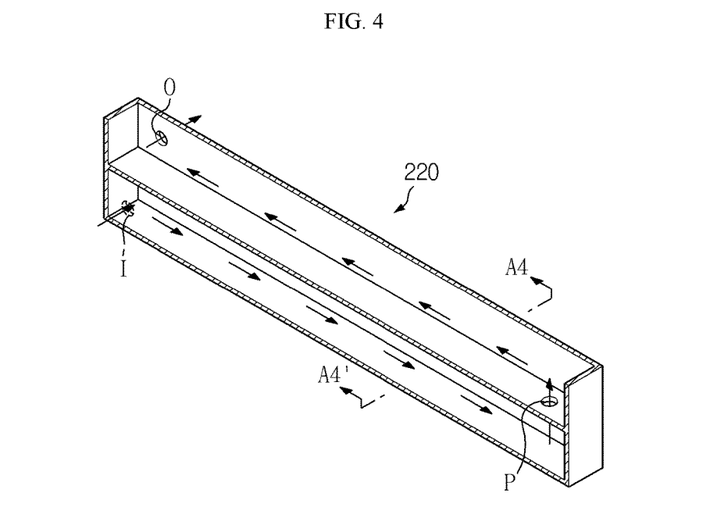
FIG. 4 is a perspective view schematically illustrating a configuration of a side wall part of a pack case according to another embodiment of the present disclosure.
Figure 5:
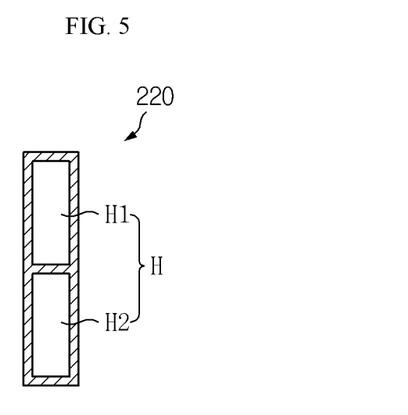
FIG. 5 is a cross-sectional view taken along a line A4-A4' of FIG. 4.

FIG. 4 is a perspective view schematically illustrating a configuration of the side wall part 220 of the pack case 200 according to another embodiment of the present disclosure, and FIG. 5 is a cross-sectional view taken along a line A4-A4' of FIG. 4. For convenience of description, FIG. 4 illustrates the inner surface and the upper surface of the side wall part 220 are cut. Here, the side wall part 220 illustrated in FIG. 4 may configure a partial side wall part, for example, all or a portion of the right side wall part in the pack case 200 of FIG. 1.

Referring to FIGS. 4 and 5, the pack case 200 may include two or more hollows H. That is, the side wall part 220 of the pack case 200 includes an empty space therein, and the inner space may be divided into two or more compartments by a partition wall. Also, each compartment may configure a separate hollow H. For example, the side wall part 220 of the pack case 200 may include two hollows as marked by H1 and H2 in FIG. 5. According to the configuration of the present disclosure, a discharge path of gas, flame, etc. may be provided in various numbers or various forms.

Particularly, in the pack case 200, two or more hollows may be vertically arranged. For example, as illustrated in FIGS. 4 and 5, the side wall part 220 may include two hollows, and the two hollows may be vertically arranged. That is, the inner space of the side wall part 220 may include an upper hollow H1 and a lower hollow H2.

Here, a vertical through part may be provided between the two or more vertically arranged hollows. For example, in the configuration illustrated in FIGS. 4 and 5, the upper hollow H1 may be separated from the lower hollow H2 by a central partition wall, and a vertical opening, that is, a through part may be provided to at least a part of the partition wall as marked by P. Also, the inner space of the upper hollow H1 may be connected to the inner space of the lower hollow H2 via the through part P.

In the above configuration, the inlet I and the outlet O may be provided in different hollows, respectively. For example, in the configuration of FIGS. 4 and 5, the inlet I provided to the inside of the battery pack may be provided in the upper hollow H1, and the outlet O provided to the outside of the battery pack may be provided in the lower hollow H2.

According to this configuration of the present disclosure, the length of the gas discharge path from the inlet I to the outlet O may increase remarkably. For example, referring to the configuration of FIGS. 4 and 5, the length of the hollow from the inlet I to the outlet O may be approximately sum of a length of the lower hollow H2 from the inlet I to the through part P and a length of the upper hollow H1 from the through part P to the outlet O. Therefore, the length of the hollow from the inlet I to the outlet O may be much longer than the length of the side wall part 220. Therefore, in this case, even when flame of the inside of the battery pack is introduced through the inlet I, it is very difficult for the flame to reach the outlet O by way of the hollow, so direct leakage of the flame to the outside of the battery pack may be prevented more surely. Also, in this case, temperature of gas discharged through the outlet O may be lowered while the gas passes through the hollow.

More preferably, in the pack case 200, the inlet I and the outlet O may be provided at an end part of one side of two or more hollows, and the through part P may be provided at an end part of an opposite side of the two or more hollows, that is, the end part of the another side. For example, in the configuration of FIG. 4, the inlet I and the outlet O may be provided at the left end part of the side wall part 220, and the through part P may be provided at the right end part of the side wall part 220.

According to this configuration of the present disclosure, the length of the gas discharge path from the inlet I to the outlet O may be maximized. For example, in the configuration of FIG. 4, a gas introduced through the inlet I of the lower hollow F12 flows in a right direction through the lower hollow H2, and then may be introduced to the upper hollow H1 through the through part P at the right end part of the side wall part 220. Then, the gas flows in a left direction through the upper hollow H1, and then may be discharged to the outside of the pack case 200 through the outlet O at the left end part of the side wall part 220. In this case, the length of the gas discharge path from the inlet I to the outlet O may be a length corresponding to approximately twice a horizontal length of the side wall part 220. Therefore, possibility of exposure of flame of the battery pack to the outside is reduced maximally, and temperature of the discharged gas is also lowered maximally.

Figure 6:
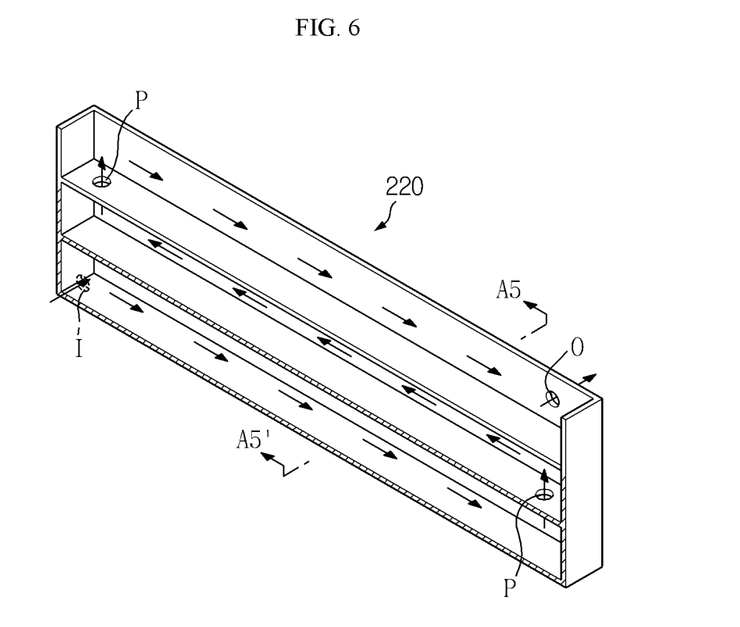
FIG. 6 is a perspective view schematically illustrating a configuration of a side wall part of a pack case according to still another embodiment of the present disclosure.
Figure 7:
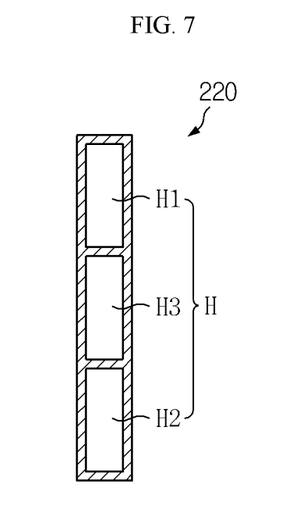
FIG. 7 is a cross-sectional view taken along a line A5-A5' of FIG. 6.

FIG. 6 is a perspective view schematically illustrating a configuration of the side wall part 220 of the pack case 200 according to still another embodiment of the present disclosure, and FIG. 7 is a cross-sectional view taken along a line A5-A5' of FIG. 6. For convenience of description, FIG. 6 illustrates the inner surface and the upper surface of the side wall part 220 are cut. Meanwhile, the side wall part 220 illustrated in FIG. 6 may configure a partial side wall part, for example, all or a portion of the right side wall part in the pack case 200 of FIG. 1. In the configurations of FIGS. 6 and 7, for parts to which descriptions of the above embodiments are equally or similarly applicable, descriptions thereof are omitted, and different parts are mainly described.

Referring to FIGS. 6 and 7, the pack case 200 may include three hollows vertically as marked by H1, H2, and H3. Also, the three hollows, that is, the upper hollow H1, an intermediate hollow H2, and the lower hollow H3 may be provided such that a flow direction of fluid in the inside is configured in a horizontal direction perpendicular to the thickness direction of the side wall part.

Also, a through part P may be provided between the three hollows. For example, the through part P may be provided between the upper hollow H1 and the intermediate hollow H3, and between the intermediate hollow H3 and the lower hollow H2. In this case, the through part P between the lower hollow H2 and the intermediate hollow H3 may be provided at a right end part of the side wall part 220, and the through part P between the intermediate hollow H3 and the upper hollow H1 may be provided at a left end part of the side wall part 220. Also, the inlet I may be provided at a left end part of the lower hollow F12, and the outlet O may be provided at a right end part of the upper hollow H1.

According to the embodiment, a discharge path of gas or flame may be lengthened even more than the embodiment of FIGS. 4 and 5. That is, in the embodiment of FIGS. 6 and 7, a gas, introduced through the inlet I may flow in a right direction along the lower hollow H2 and then be introduced to the intermediate hollow H3 through the through part P and flow in a left direction. Then, the gas which reaches a left end part of the intermediate hollow H3 may be introduced to the upper hollow H1 through the through part P and may flow in the right direction and be discharged through the outlet O at a right end part of the upper hollow H1. Therefore, in this case, the discharge path of the gas may have a length approximately three times the horizontal length of the side wall part 220.

Figure 8:
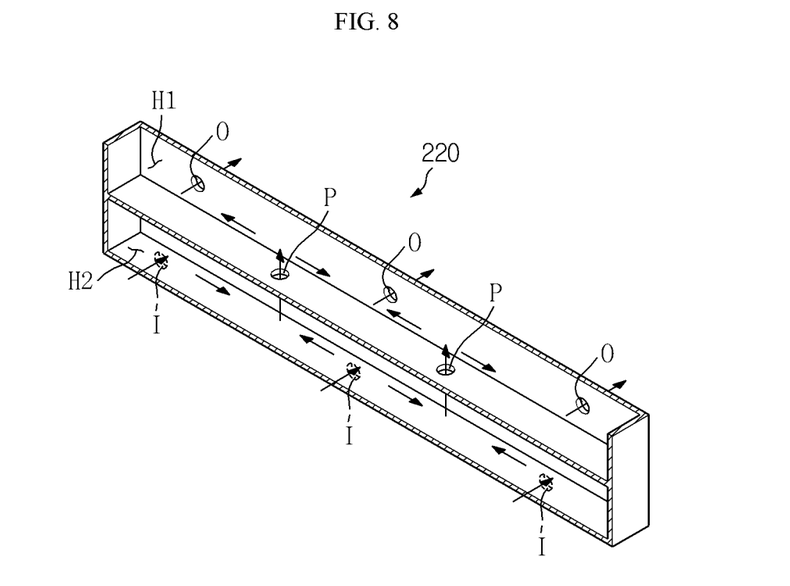
FIG. 8 is a perspective view schematically illustrating a configuration of a side wall part of a pack case according to still another embodiment of the present disclosure.

FIG. 8 is a perspective view schematically illustrating a configuration of the side wall part 220 of the pack case 200 according to still another embodiment of the present disclosure. For convenience of description, FIG. 8 illustrates the inner surface and the upper surface of the side wall part 220 are cut. The side wall part 220 illustrated in FIG. 8 may configure, for example, all or a portion of the right side wall part in the pack case 200 of FIG. 1. In the embodiment, parts which are different from the above embodiments are mainly described.

Referring to FIG. 8, the pack case 200 may include a plurality of inlets I and a plurality of outlets O. That is, in the configuration of FIG. 8, two hollows classified as an upper hollow H1 and a lower hollow H2 are provided to the side wall part 220. Three inlets I are provided in the lower hollow H2, and three outlets O are provided in the upper hollow H1. In this case, a gas introduced through the three inlets I may flow horizontally through the lower hollow H2, reach a through part P, and move to the upper hollow H1. The gas introduced to the upper hollow H1 may flow through the upper hollow H1 horizontally and then be discharged to the outside through the plurality of outlets O.

Also, the pack case 200 may include a plurality of through parts P. That is, in the configuration of FIG. 8, two through parts P are provided between the upper hollow H1 and the lower hollow H2.

According to the configuration of the present disclosure, a gas discharge may be performed more swiftly. That is, in the case where a large amount of gas are generated from the inside of the battery pack or a gas is generated from a specific part, the relevant gas may be introduced to the hollow in various directions through the plurality of inlets I, and swiftly discharged to the outside through the plurality of through parts P and the plurality of outlets O.

Particularly, in this case, the through parts P may not be provided, horizontally, at locations same as or similar to those of the inlets I and/or the outlets O, but may be provided at different locations. For example, as illustrated in FIG. 6, the through hole P may be located between the inlet I and the outlet O. According to this configuration, even when the plurality of inlets I, outlets O, and/or through parts P are provided, the length of the gas discharge path may be lengthened maximally.

Figure 9:
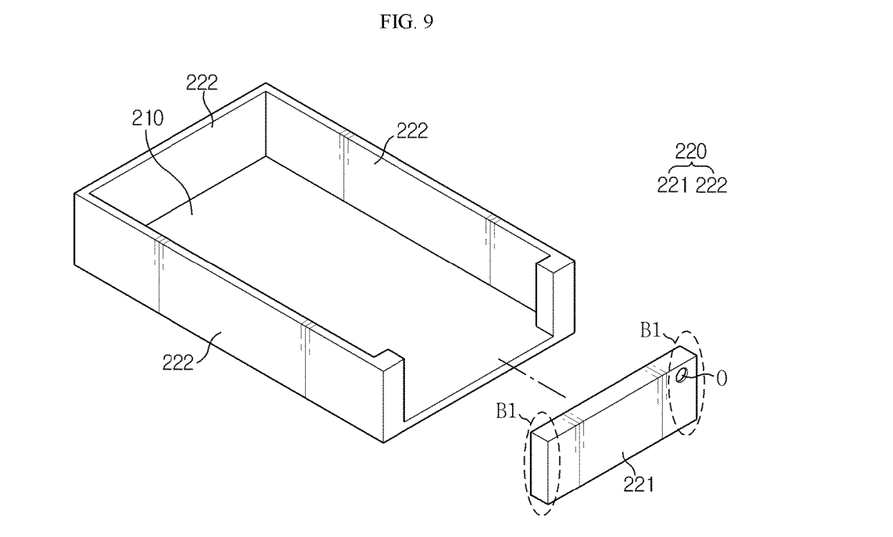
FIG. 9 is a perspective view illustrating a part separated from a pack case of the battery pack of FIG. 1.

FIG. 9 is a perspective view illustrating a part separated from a pack case 200 of the battery pack of FIG. 1.

Referring to FIG. 9, the pack case 200 includes the bottom part 210 and the side wall part 220. The side wall part 220 may include a first side wall 221 and a second side wall 222. Here, like the side wall parts 220 illustrated in FIGS. 2 to 8, the first side wall 221 may be a side wall including a hollow therein. Also, the second side wall 222 may be a side wall not including a hollow. Also, the various embodiments of the side wall part 220 illustrated in FIGS. 2 to 8 are applicable to the first side wall 221 in the configuration of FIG. 9.

According to the configuration of the present disclosure, the pack case 200 may be more easily manufactured. Manufacturing the side wall part 220 at a time such that a hollow is provided to a preset part and a hollow is not provided to the other part may be difficult. However, since the present embodiment may manufacture the first side wall 221 including a hollow and the second side wall 222 not including a hollow separately, the side wall part 220 including a hollow at only a preset part may be easily manufactured. Particularly, the side wall part 220 may be configured such that the first side wall 221 includes the hollow therein in the form of an extruded frame, and then opposite ends of the first side wall 221 are covered. The first side wall 221 may include an inlet I and an outlet O. Also, in the case where the side wall part 220 includes a plurality of hollows and so one or more through parts P are provided, the through part P may be formed by boring a hole in an outer surface of the first side wall 221, for example, an upper surface or a lower surface of the first side wall 221 in order to form the through part P, inserting a drill through the hole, and boring a hole in a partition wall between the hollows.

In this configuration, the first side wall 221 may be arranged in the peripheral direction of the bottom part 210 with respect to the second side wall 222. That is, in the pack case 200 of FIG. 9, the whole of a front side wall part, a rear side wall part, and a left side wall part, and a portion of a right side wall part may configure the second side wall 222. Also, most of the right side wall part of the pack case 200 may configure the first side wall 221. Therefore, the first side wall 221 and the second side wall 222 may be coupled to provide an upper surface in a ring shape.

In this case, opposite ends of the first side wall 221 may be coupled to the second side wall 222. That is, the opposite ends of the first side wall 221 marked by B1 in FIG. 9 contact opposite ends of the second side wall 222 to define an inner space, and the contact parts may be coupled and fixed. In this case, a coupling and fixing method of the first side wall 221 and the second side wall 222 may be various. Welding may be used as a representative method. That is, the opposite ends of the first side wall 221 may be coupled and fixed to the second side wall 222 by using welding.

Meanwhile, though the embodiments mainly illustrate the hollow is provided in a horizontal direction among directions perpendicular to the thickness of the side wall part 220, the present disclosure is not limited thereto and the hollow may be provided in various forms.

Figure 10:
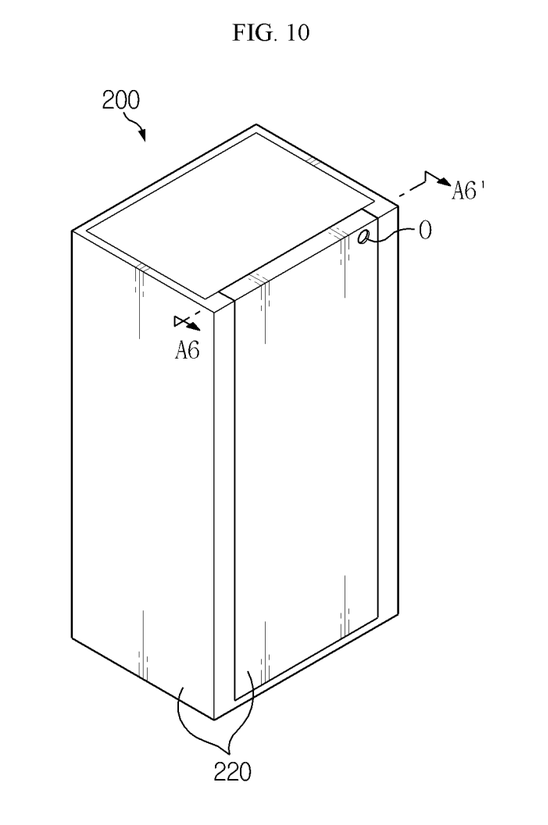
FIG. 10 is a perspective view schematically illustrating a configuration of a side wall part of a battery pack according to another embodiment of the present disclosure.
Figure 11:
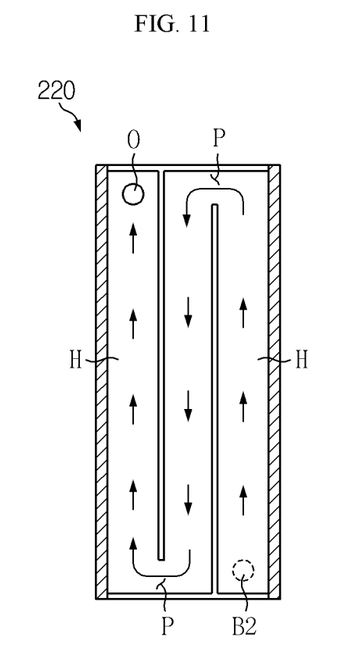
FIG. 11 is a cross-sectional view taken along a line A6-A6' of FIG. 10.

FIG. 10 is a perspective view schematically illustrating a configuration of the side wall part 220 of the battery pack according to another embodiment of the present disclosure, and FIG. 11 is a cross-sectional view taken along a line A6-A6' of FIG. 10. In the embodiment of FIGS. 10 and 11, parts which are different from the above embodiments are mainly described.

Referring to FIGS. 10 and 11, the side wall part 220 of the pack case 200 may include a plurality of hollows, and each hollow may be provided in a vertical direction among directions perpendicular to the thickness direction of the side wall part 220. In this case, in the case where an inlet I is provided to a part marked by B2 in FIG. 1I, fluid, for example, gas introduced through the inlet I may flow in an upward direction through a right hollow and be introduced to a central hollow through a through part P, and then flow in a downward direction. Then, the gas may be introduced to a left hollow through a through part P located in a lower portion of the central hollow and then flow in the upward direction and be discharged to the outside of the pack case 200.

According to the configuration of the present disclosure, like the previous embodiments in which the hollow is provided horizontally, the length of the gas discharge path may be advantageously lengthened. Particularly, as illustrated in FIG. 10, the pack case 200 of the battery pack may be provided vertically long, and in this case, a plurality of hollows may be easily provided by providing vertical hollows.

Furthermore, the side wall part 220 having a configuration in which a horizontal hollow and a vertical hollow are mixed may be possible. In this case, since the pack case 200 of the battery pack may be configured in various forms and the inlet I and the outlet O may be also arranged at various locations, the present disclosure is efficiently adaptable to various battery pack configurations or mounting locations through an appropriate arrangement of the horizontal hollow and the vertical hollow.

Preferably, the pack case 200 may at least partially include a metallic material. For example, the pack case 200 may include an aluminum material on the whole. A metallic material such as aluminum has excellent mechanical rigidity and so may effectively protect the cell assembly 100, etc. against an external impact, etc. Particularly, since the metallic material is not easily molten compared with a plastic material when fire occurs in the inside of the battery pack, flame may not easily leak to the outside of the battery pack. Furthermore, the battery pack according to the present disclosure may effectively prevent leakage of flame through a configuration of the hollow of the side wall part 220.

Meanwhile, though not shown in the drawings, the pack case 200 of the battery pack according to the present disclosure may further include a cover part.

The cover part may be mounted on an upper end of the side wall part 220 to seal an inner space of the pack case 200. Therefore, the cover part may cover an upper side of the cell assembly 100. For example, similarly with the bottom part 210, the cover part may be configured in a plate form and mounted on the upper end of the side wall part 220. Also, the cover part may be fixed to the side wall part 220 by using a fastening member such as a bolt or welding, etc.

The battery pack is applicable to an automobile such as an electric automobile or a hybrid automobile. That is, an automobile according to the present disclosure may include the battery pack according to the present disclosure. Particularly, in the case of an automobile, since a passenger may be nearby and the automobile may be adjacent to a fuel tank of another automobile, when fire occurs in the inside of the battery pack, flame thereof should not be easily exposed to the outside. Since the battery pack according to the present disclosure has an excellent flame exposure prevention effect, the safety of an automobile may be improved.

Meanwhile, although terms representing directions such as up, down, left, right, front, and rear are used in the present specification, it is obvious to those skilled in the art that these terms are used for convenience of description only, and the terms may change depending on a location of an object considered as a subject or a location of an observer, etc.

Although the present application has been described through limited embodiments and drawings, the present application is not limited thereto and it is obvious that various changes and modifications may be made by those skilled in the art within the technical spirit of the present disclosure and equivalent scope of appended claims.

What is claimed is:

1. A battery pack comprising:
   a cell assembly comprising a plurality of secondary batteries; and
   a pack case comprising:
      a bottom part having a plate shape and located under the cell assembly; and
      a side wall part provided on the bottom part and protruding vertically from the bottom part to a preset height, the pack case accommodating the cell assembly in an inner space defined by the bottom part and the side wall part,
   wherein the side wall part includes a first side wall and a second side wall,
   wherein the second side wall includes three planar walls and two protrusions facing towards each other,
   wherein the first side wall extends between the two protrusions, and
   wherein the first side wall is hollow in a direction at least partially perpendicular to a thickness direction of the first side wall, and comprises an inwardly open inlet open at the inner space and an outwardly open outlet.

2. The battery pack of claim 1, wherein the first side wall is provided on a periphery of the bottom part.

3. The battery pack of claim 1, wherein the first side wall includes at least two separate hollow chambers.

4. The battery pack of claim 3, wherein the at least two separate hollow chambers are vertically arranged in the first side wall,
   wherein a vertical through part, in the form of an aperture, is provided between the at least two separate chambers, and
   wherein the inlet and the outlet are provided in different chambers among the at least two separate chambers.

5. The battery pack of claim 4, wherein, in the pack case, the inlet and the outlet are provided at an end part of one side of the at least two chambers, and
   wherein the through part is provided at an end part of another side of the at least two chambers.

6. The battery pack of claim 1, wherein the pack case comprises two or more inlets and two or more outlets.

7. The battery pack of claim 1, wherein only the first side wall is hollow.

8. The battery pack of claim 7, wherein the protrusions of the second side wall are formed at respective ends of the second side wall, and
   wherein the protrusions are coupled to respective end surfaces of the first side wall.

9. The battery pack of claim 1, wherein the direction the first side wall is hollow is a vertical direction.

10. The battery pack of claim 1, wherein the pack case comprises a metallic material.

11. An automobile comprising the battery pack of claim 1.

12. The battery pack of claim 1, wherein the three planar walls of the second side wall include:
   first and second planar walls extending parallel to one another and in a length direction of the battery pack; and
   a third planar wall extending between the first and second planar walls and extending in a width direction of the battery pack, and
   wherein the two protrusions extend in the width direction of the battery pack.

* * * * *